United States Patent
Sivkov

(10) Patent No.: US 11,273,879 B2
(45) Date of Patent: Mar. 15, 2022

(54) MOTORIZED TOWING VEHICLE

(71) Applicant: OBSHHESTVO S OGRANICHENNOJ OTVETSTVENNOSTYU "KALININGRADSKIJ MOTOZAVOD", Kaliningrad (RU)

(72) Inventor: Dmitrii Anatolyevich Sivkov, Kaliningrad (RU)

(73) Assignee: OBSHHESTVO S OGRANICHENNOJ OTVETSTVENNOSTYU "KALININGRADSKIJ MOTOZAVOD", Kaliningrad (RU)

( * ) Notice: Subject to any disclaimer, the term of this patent is extended or adjusted under 35 U.S.C. 154(b) by 185 days.

(21) Appl. No.: 16/467,466

(22) PCT Filed: Nov. 7, 2017

(86) PCT No.: PCT/RU2017/000827
§ 371 (c)(1),
(2) Date: Jun. 6, 2019

(87) PCT Pub. No.: WO2018/106145
PCT Pub. Date: Jun. 14, 2018

(65) Prior Publication Data
US 2020/0094917 A1    Mar. 26, 2020

(30) Foreign Application Priority Data
Dec. 8, 2016    (RU) .......................... RU2016148294

(51) Int. Cl.
*B62D 55/07*    (2006.01)
*B62D 55/10*    (2006.01)
(Continued)

(52) U.S. Cl.
CPC ............. *B62D 55/07* (2013.01); *B62D 55/10* (2013.01); *B62D 55/15* (2013.01); *B62M 27/02* (2013.01)

(58) Field of Classification Search
CPC ....................................... B60D 55/07
See application file for complete search history.

(56) References Cited

U.S. PATENT DOCUMENTS 2,289,768 A * 7/1942 Fehrenbacher ........ B62M 27/02
180/190
9,821,865 B2 * 11/2017 Martel ................... B62D 51/04

FOREIGN PATENT DOCUMENTS

CA        2509886 A1    12/2005
CN    110065587 A  *   7/2019
(Continued)

*Primary Examiner* — Kevin Hurley
(74) *Attorney, Agent, or Firm* — Porter, Wright, Morris & Arthur, LLP

(57) ABSTRACT

The invention is related to the class of small-scale tracked transportation vehicles, which can be used for towing a person and cargo using a sledge, for example. The motorized towing vehicle comprises a frame supporting a caterpillar drive, a platform supporting an engine with a transmission, a luggage space, an assembly for connecting to the object being towed object, a control device, and an object being towed. The caterpillar drive includes a caterpillar track, a metal subframe, a driven shaft and a driving shaft with pinions, and torsion-type wheel bogie. The control device consists of a steering wheel with handles and controls. The object being towed comprises a driver's workplace. The frame consists of a platform and a rigid framework enclosing the platform along the entire perimeter, including the luggage compartment with an additional luggage space above. The design of the frame and platform is asymmetrical relative to the track because of an extension of the platform in one direction. The subframe is in the form of metal side (Continued)

Figure 1:
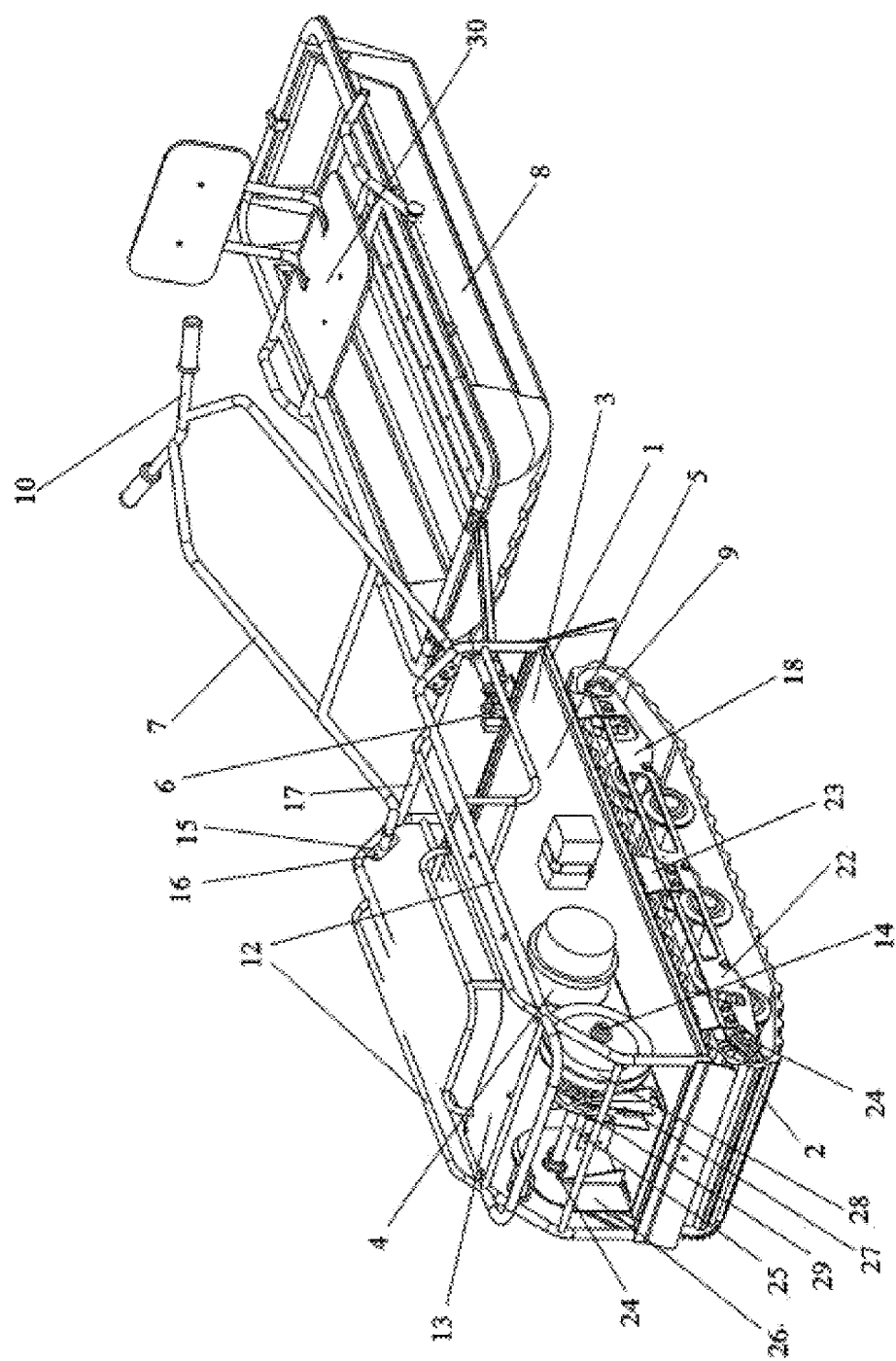

plates connected to the frame with brackets bent into an S-shape. The subframe plates accommodate a track tightening mechanism in the form of an eccentric and self-aligning bearings. An all-weather hood is used for protecting the engine and luggage space. The road performance of the motor towing vehicle has been improved.

8 Claims, 6 Drawing Sheets

(51) Int. Cl.
*B62D 55/15* (2006.01)
*B62M 27/02* (2006.01)

(56) References Cited

FOREIGN PATENT DOCUMENTS

| | | | |
|---|---|---|---|
| FR | 2883244 A1 * | 9/2006 | ............. B62B 17/04 |
| RU | 81154 U1 | 3/2009 | |
| RU | 99761 U1 | 11/2010 | |
| RU | 125539 U1 * | 3/2013 | |
| RU | 134144 U1 * | 11/2013 | |
| RU | 147074 U1 | 10/2014 | |
| RU | 151139 U1 | 3/2015 | |
| RU | 153611 U1 * | 7/2015 | |
| WO | 2007/100274 A1 | 9/2007 | |

* cited by examiner

MOTORIZED TOWING VEHICLE

The invention is related to the class of small-sized tracked transportation vehicles, which can be used for towing a person and cargo using a sledge, for example. The field of application is the all-weather transportation of people and cargo across any terrain, including soft soil and snow-covered terrains, deep snow, off-road, thin ice, and swamps. The vehicle can be used by fishermen, hunters, foresters, geologists, tourists, as well as for special purposes, for example, by the Ministry of Emergency Situations, object patrolling, in expeditions, in ski resorts, etc.

There is a wide range of patents relating to small-sized tracked motorized towing vehicles with a single track. If we take a look at the inventions and utility models of the closest analogs of the motorized towing vehicle in question, we will see a whole series of patents by both patent authors (for example, Vitaly Lebedev (St. Petersburg)—6 utility model patents, Lev Biryukov (Arkhangelsk)—13 utility model patents) and patent holders of legal entities (for example, the PF «Buran-chassis» Limited Liability Company, «Raida» Limited Liability Company, «Rusichi» Limited Liability Company). It should also be noted that a part of the patents for inventions and utility models is related to small-sized two-track motorized towing vehicles, very similar to each other in design.

All analogs of motorized towing vehicles contain a frame supporting a caterpillar drive, a platform carrying the engine, a luggage space, an assembly for connecting to the towed object, a control device, and a towed object. In this case, the caterpillar drive comprises torsion-type wheel bogies or slides, driven and driving shafts with sprockets, and a track tightening mechanism. The control device consists of a steering wheel with handles and controls. The engine is usually covered by a protective hood. The towed object contains the driver's workplace.

There a similar model exists known as «Oversnow motorized towing vehicle», utility model patent RU81154 U1 B62M27/02, application 2008141116/22 dated Oct. 16, 2008, patent valid starting Oct. 16, 2008, published on Mar. 10, 2009, the patent holder is a PF «Buran-Chassis» Limited Liability Company, the author is Anatoly Alexandrovich Kudryavov.

This model uses the method of track tightening when the driven shaft of the propulsion unit is mounted between the plates, which have horizontal grooves where the tension is created by adjusting bolts with facing the shaft.

In this version of the design of the track tightening mechanism, it is impossible to create uniform tension of the track on both sides, which leads to a decrease in the service life of the moving elements (sprocket, bearing and track).

Another similar model is «Oversnow motorized towing vehicle», patent for utility model RU 151139 U1 MПК B62M27/02, application 2014116013/11 dated Apr. 21, 2014, patent valid starting Apr. 21, 2014, published on Mar. 20, 2015, the patent holder and author is Igor Fedorovich Lavrinenko.

The disadvantages of the motorized towing vehicle are as follows.

The disadvantage common for all motorized towing vehicles (including the vehicle under this patent) is that they do not have protective framework around the whole perimeter, only partial one that does not feature a propelling function.

The frame is the main strength element of the structure on which the engine, transmission, luggage space and propulsion unit are placed. To ensure strength and rigidity, the platform is metal-intensive and, therefore, heavy.

The layout of the transmission does not allow to simultaneously place the variator pulley, brake mechanism and reverse-reducer on the intermediate shaft of the transmission, which affects the safety and limitations of the use of the device.

The location of the chain drive outside the frame, which leads to an increase in risk during operation.

The absence of a stop in the steering wheel mount, which would allow the steering wheel to be fixed both in respect to the driver's height and in the lowest position, and also to use the steering wheel as a lever to navigate the terrain while driving. All these shortcomings lead to the inconvenience of use.

A propulsion unit consisting of the track, subframe, has a track tightening mechanism, implemented on both sides in the form of a threaded connection with a nut, which makes it difficult to create uniform tension of the caterpillar drive.

All common motorized towing vehicles, including the device according under patent No. 151139, use conventional radial rolling bearings on the drive shaft, which, when operated under structural skewness, are subjected to lateral loads, which leads to rapid wear of the bearing and reduced service life.

The hood cover, which, with its rigid construction and protrusions, increases the dimensions of the device and creates additional resistance when driving, which reduces usability.

The vehicle that can be considered the closest prototype to the one under this patent is «Towing vehicle», patent No. 147074 RU, MПК B62D 55/00, application: 2014126226/11 of dated Jun. 27, 2014, the patent holder—«Rusichi» Limited Liability Company, the authors are Sergey Dmitrievich Dubovoy and Stanislav Alekseevich Kirillov.

The vehicle has certain usability limitations due to the following disadvantages:

does not have protective framework around the whole perimeter, only partial protection that does not feature a propelling function;

the use of complex mechanisms for tensioning the caterpillar track in the form of pipes with boxes for the driven and driving shafts, their movement based on the threaded connection and fixing with a lock nut; when the adjusting screw on each side of the track displaces the axis, it is difficult to create the same tightening on both sides, skewness is possible;

the use of the cantilever bracket mounting for the intermediate transmission shaft, in which large-dimension reinforcement elements are used to ensure rigidity, which leads to a significant increase in weight and to a complex installation of the brake mechanism and reverse gearbox;

the use of standard radial rolling bearings, which are subjected to transverse loads during operation due to the skewness of the frame, which leads to its rapid wear;

mounting of the subframe and track elements outside the dimensions of the track, which leads to a possible collision with obstacles during the ride and the possibility of snow, dirt, stones and other foreign objects getting inside the track;

the location of the chain drive outside the dimensions of the frame, which leads to an increase in danger to the driver during operation;

the steering controls, which are mounted through a single point to the rear of the frame and without a stop in the lower position, which requires considerable effort from the driver to control the vehicle;

the hood whose rigid construction and protruding elements increase the dimensions of the vehicle and has low performance qualities (mounting complexity, low impact resistance, hard to manufacture), which leads to the poor usability.

The goals of the present invention are to create a more convenient and safe motorized towing vehicle, which would be reliable in everyday operation, compact for transportation and have an increased service life.

The proposed motorized towing vehicle allows its operators to achieve the following technical results: increased rigidity of the structure, uniform track tension, improved transmission layout, the longer service life of bearings, optimal chain drive placement, improved subframe, the use of a convertible steering wheel, and the lightweight streamlined framework.

To reach the goals that have been set and achieve the proposed technical results, we have come up with a motorized towing vehicle with a frame carrying a caterpillar drive, a platform carrying an engine with a transmission, a luggage space, an assembly for connecting to the towed object, a control device, and a towed object.

In this case, the caterpillar drive includes a track tightening mechanism, a metal subframe, driven and driving shafts with gears, torsion-type wheel bogies. The control device consists of a steering wheel with handles and controls. Engine and luggage space are covered with a hood. The towed object contains the driver's workplace.

The proposed motorized towing vehicle is different from the prototype in several ways.

The frame consists of a platform and a rigid frame enclosing the platform along the entire perimeter, including the luggage compartment with an additional luggage space at the top. A rigid volumetric frame built of metal tubes protects the engine and its elements and prevents the load from collisions with objects on the road or tilting on its side. The frame can also be used for loading and transportation. The design of the frame and platform is asymmetrical relative to the caterpillar track by extending the platform in one direction, which makes it possible to place the chain drive of the transmission within the platform dimensions. This type of frame and platform design is more rigid. It increases safety during the operation and also ensures convenience when loading and transporting.

The frame can be set high during the regular installation of the engine and its elements or low when installing engine elements on the frame.

For example, the frame carrying the engine with the transmission and the luggage space is made of waterproof laminated plywood, which is rigidly mounted to the frame.

The steering wheel of the control device is made in the form of a metal truss consisting, for example, of tubes, and is attached to the upper part of the frame for easier handling. Thanks to the hinge mechanism, the steering wheel can be folded without the use of tools within the dimensions of the motorized towing vehicle, which is convenient for transportation. There are three points of attachment via which the steering wheel is mounted to the frame in accordance with the driver's height, which increases the ease of operation. The three points of attachment are made in mounting plates welded to the frame from two sides. The steering wheel is delimited in the lower position by a special transverse tube. This tube makes it possible to effectively operate the motorized towing vehicle in difficult road conditions—for example, while going uphill—without any extra efforts, which increases the capabilities of the motorized towing vehicle and ease of handling.

The subframe is in the form of metal side plates made with cut-out holes connected to the frame by brackets bent into an S shape. The brackets of this shape make it possible to place the subframe within the track dimensions, which eliminates the possibility of collision with obstacles during the ride and allows you to clean the track easily. It also improves safety and ease of maintenance. The mechanisms for tensioning the caterpillar track in the form of an eccentric and self-aligning bearings are arranged on the subframe plates. This type of subframe simplifies the overall vehicle design, makes it more lightweight and differs from what the similar models have to offer. As a rule, the similar models use pipes with boxes for bearings at the ends as a power element, or there is no subframe at all. The use of self-aligning bearings allows increasing the reliability of the construction design and the service life of the bearings.

The mechanism for tensioning the caterpillar track uses an eccentric, which helps to equalize the track tightening on both sides. As a result, the track tightening process is quite simple.

The layout of the transmission elements is done via increasing the length of the intermediate shaft mounted on the support brackets, placed far enough from each other to make it possible to place the driven variator pulley, brake mechanism, and reverse gear on the intermediate shaft. The intermediate shaft is also mounted on self-aligning bearings. This arrangement gives the structure its rigidity and reduces the metal consumption during the manufacturing.

The motorized towing vehicle is equipped with an all-weather hood protecting the engine and the luggage space from snow, rain, and dirt. The all-weather hood is made of lightweight, durable, and water-repellent materials. It follows the shape of the structure, does not create additional resistance and load on the structural elements during movement, provides free and fast access to the engine elements.

The towed object is in the form of a sledge, equipped with a metal drawbar for rigid coupling with the motorized towing vehicle, the driver's seat is made in the form of a tubular welded structure with a folding back featuring four attachment points to the sides of the sledge. The back and seat are made of laminated waterproof plywood.

The proposed motorized towing vehicle allows its operators to benefit from the increased rigidity of its structure, uniform track tightening, improved transmission layout, an extended service life of bearings, rational arrangement of the chain drive, improved subframe, convertible steering wheel, and the presence of a lightweight, streamlined hood.

Figure 2:
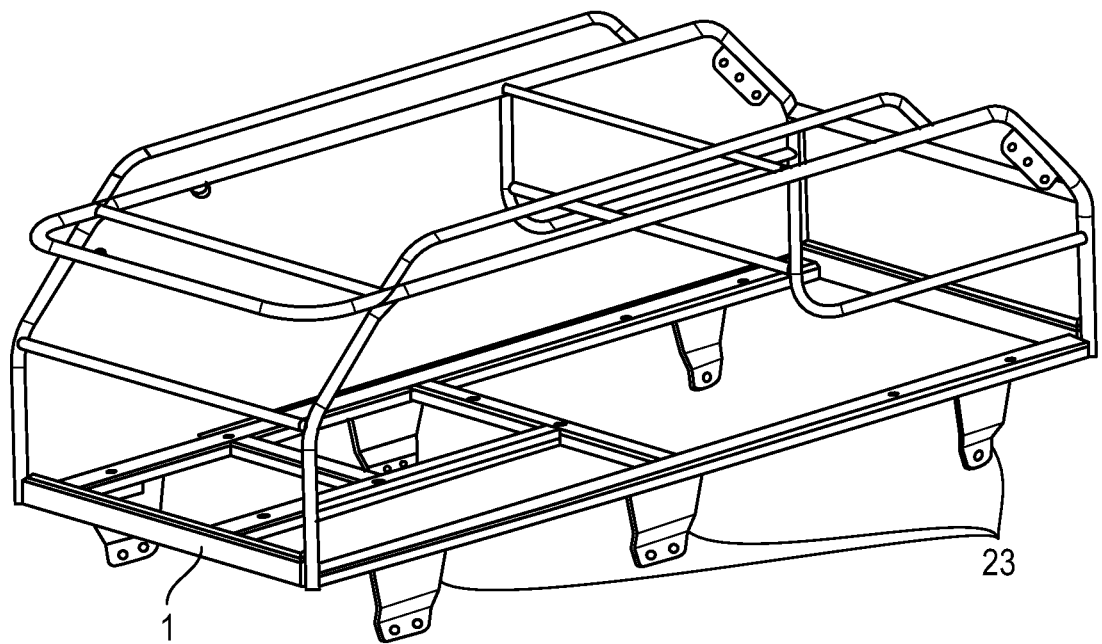
Figure 2:
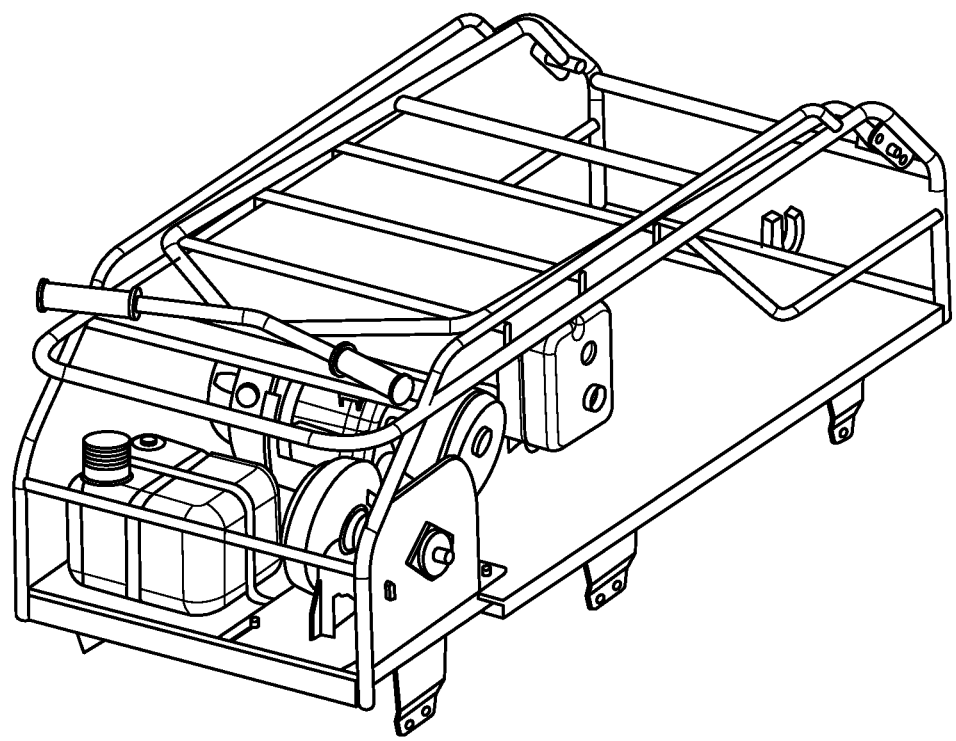
Figure 3:
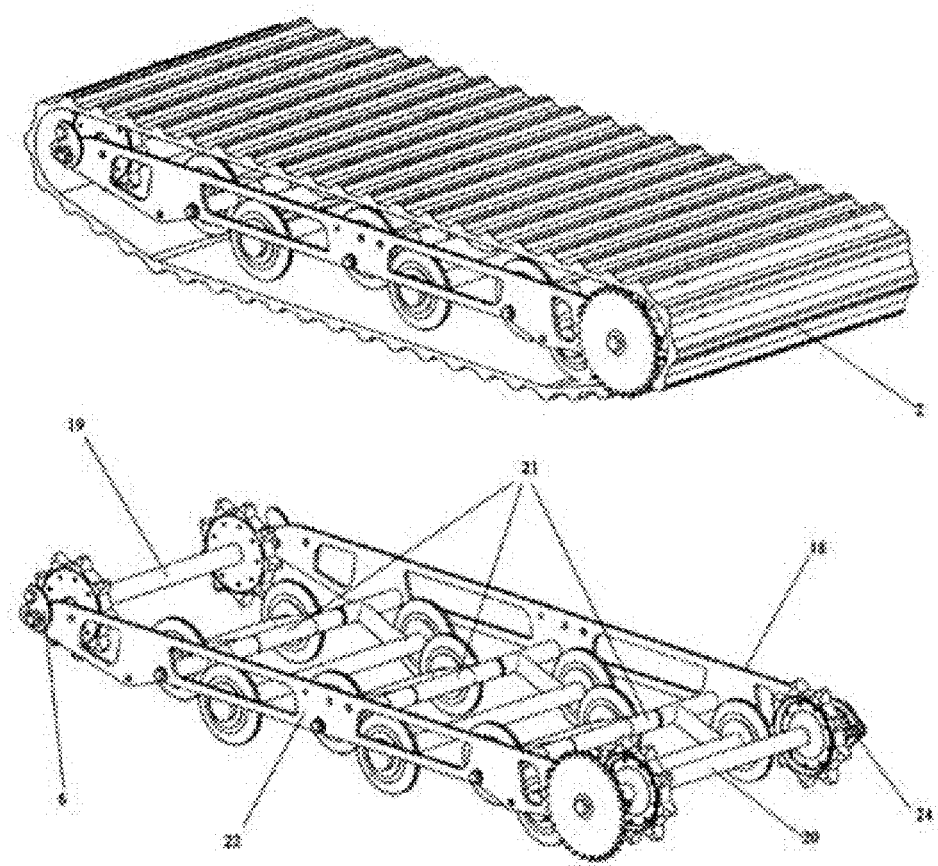
Figure 4:
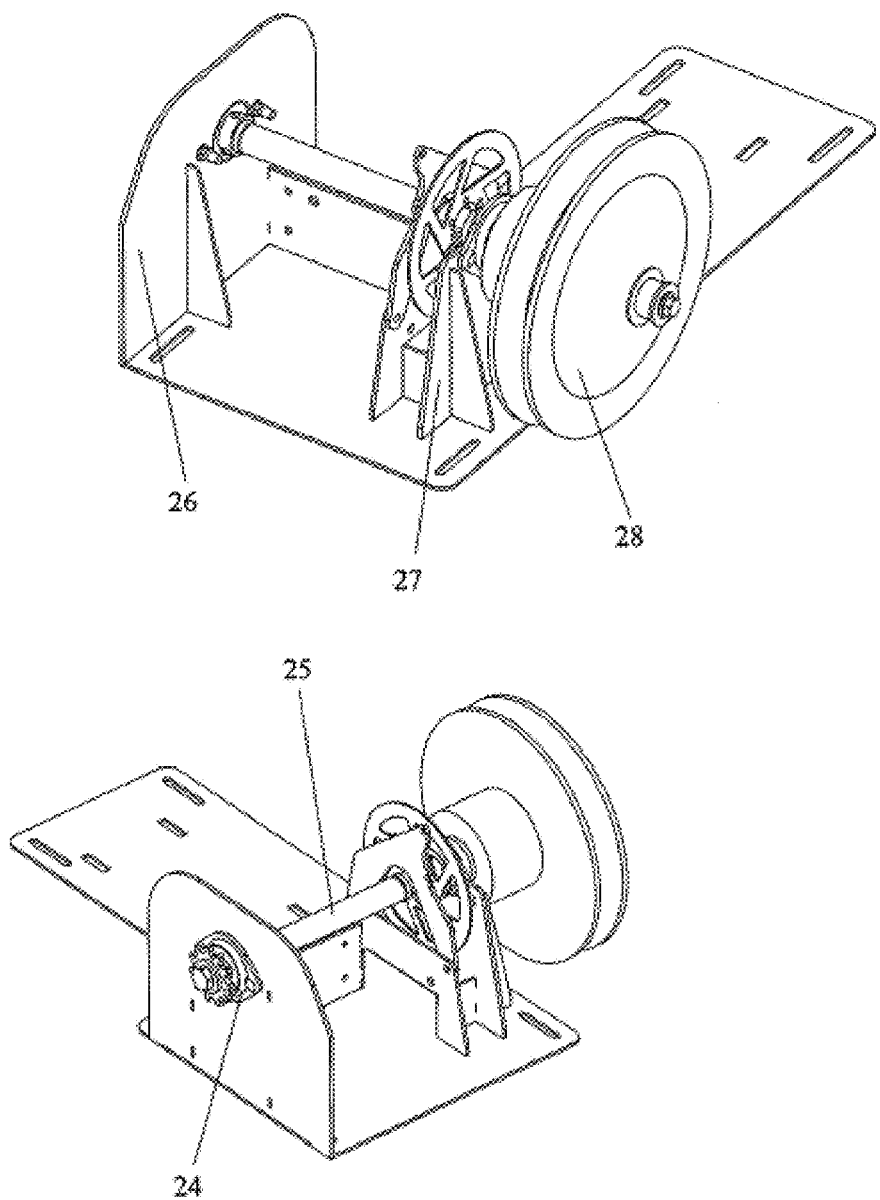
Figure 5:
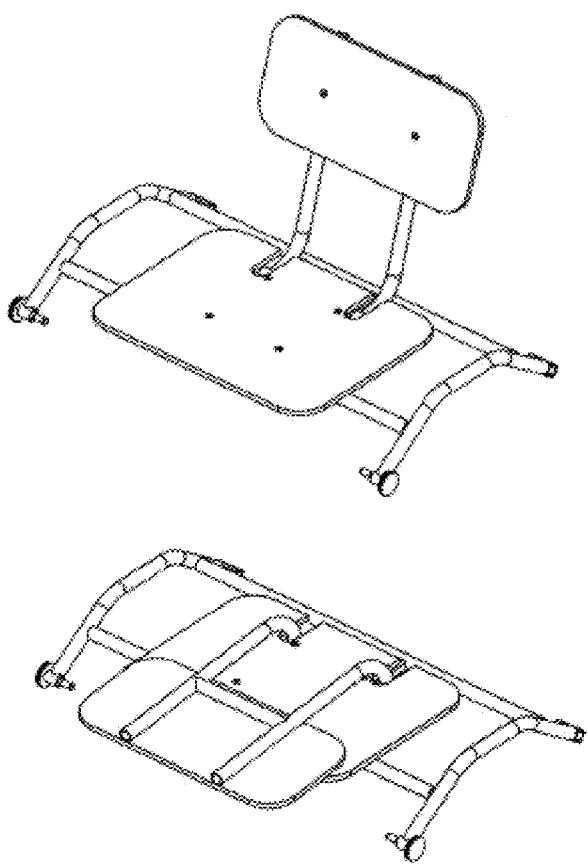
Figure 6:
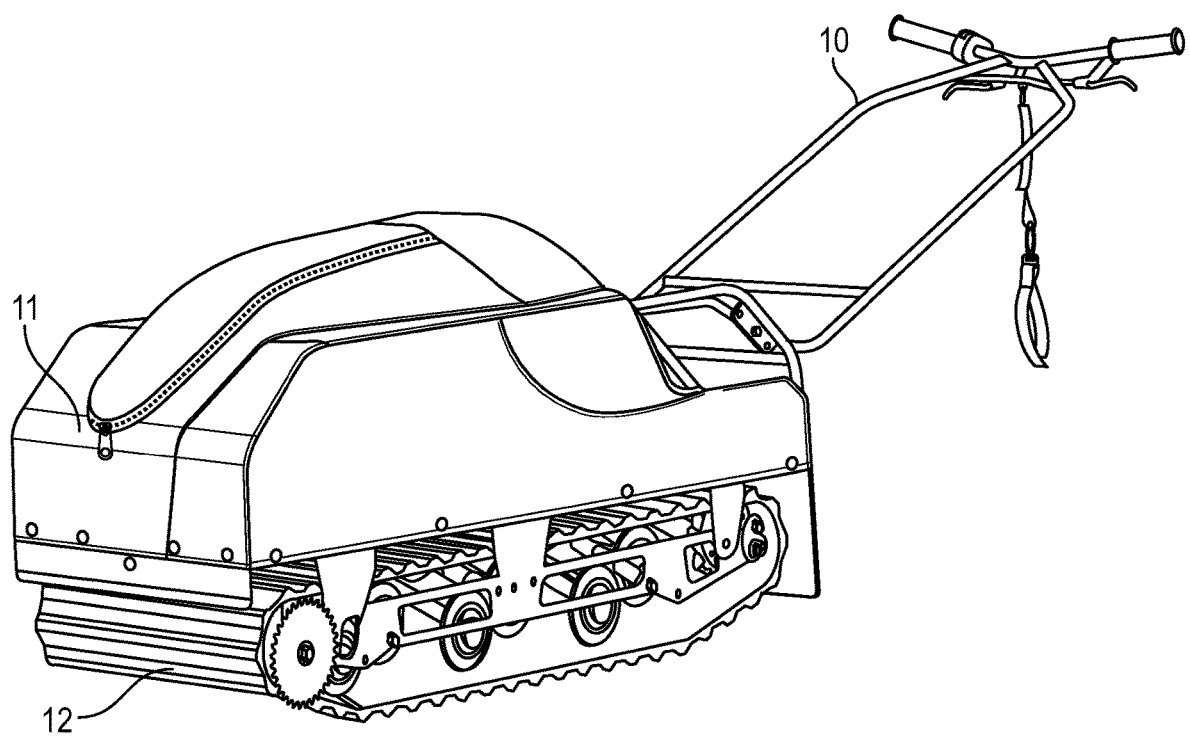

The following schemes provide a better insight into the construction and features of the proposed motorized towing vehicle:

FIG. 1—overall view of the motorized towing vehicle with a towed object;

FIG. 2—frame (high and low);

FIG. 3—propulsion unit (tracked and non-tracked);

FIG. 4—transmission;

FIG. 5—folding seat on the towed object;

FIG. 6—a photo of the motorized towing vehicle covered with an all-weather hood.

The proposed motorized towing vehicle comprises a frame 1 carrying a caterpillar drive 2, a platform 3, carrying the engine 4, a luggage space 5, an assembly 6 for connecting to the towed object, a control device 7, a towed object 8. The caterpillar drive features a track tightening mechanism in the form of an eccentric 9. The control device consists of a steering wheel 10 with handles and controls.

The engine 4 and the luggage space 5 are covered with an all-weather hood 11. The towed object 8 contains the driver's workplace.

The frame 1 consists of the platform 3 and a rigid frame 12, enclosing the platform along the entire perimeter, including the luggage space 5 with additional luggage compartment at the top 13. The frame 1, along with the platform 3, is asymmetrical relative to the track because of an extension of the platform in one direction, which allows placing the transmission chain drive 14 within the dimensions of the platform.

The platform 3 carrying the engine 4 with the transmission 14 and the luggage space 5, is made from waterproof laminated plywood rigidly attached to the frame.

The control device features the steering wheel 10 and controls. The wheel 10 is made from tubes in the form of a metal truss and is attached to the upper part of the frame using plates 15 with three points of attachment 16 and the wheel position limiter 17.

The caterpillar drive 2 includes a track, a metal subframe 18, a driven shaft 19 and a driving shaft 20 with gears, torsion-type wheel bogies 21. The metal side plates of the subframe 22 are made with cut-out holes and connected to the frame by brackets bent into an S shape 23. Brackets of this shape allow you to place the subframe within the dimensions of the tracks. The subframe plates allow you to place on them the track tightening mechanisms in the form of an eccentric 9 and self-aligning bearings 24.

The layout of the transmission elements is implemented via increasing the length of the intermediate shaft 25, mounted on the support brackets 26, 27, located far enough from each other to allow you to place the driven pulley of the variator 28, brake mechanism 29, and reverse gear on the shaft. The intermediate shaft 25 is also mounted on self-aligning bearings 24.

The all-weather hood 11 protects the engine and the luggage space from snow, rain, and dirt.

The towed object 8 is in the form of a sledge, equipped with a seat 30 made in the form of a tubular welded structure with a folding back. The back and seat are made of laminated waterproof plywood.

The proposed motorcycle works as follows.

The towed object 8 (e.g., a drag or light sledge) is connected to the motorized towing vehicle via a coupling device. Before driving, the driver sets the steering wheel 10 in one of the three attachment points 16 in accordance with his/her height. The engine 4 sends the torque 14 to the track through the transmission and the motorized towing vehicle moves forward or backward with the help of the reverse gear. The driver occupies the seat 30 of the towed object 8. The direction, in which the motorized towing vehicle moves, is changed by the driver via moving the steering wheel 10 to the right or left relative to the sledge, and the driving speed is adjusted using the engine controls 7 placed on the steering wheel handles 10.

Specific examples may include the Baltmotors motorized towing vehicle, which has undergone factory tests and the pilot operation of the first batch.

Thus, the proposed motorized towing vehicle allows its owners to benefit from having a compact small-sized, tracked motorized towing vehicle, which is convenient, safe, reliable to use, compact for transportation, and has an increased service life.

The invention claimed is:

1. A motorized vehicle comprising a frame, a caterpillar drive, a platform, which is part of the frame and carries an engine with a transmission, a luggage space, an assembly for connecting to a towed object, wherein the caterpillar drive comprises a track, a metal subframe, driven and driving shafts with gears, torsion wheeled bogies, a control device comprising a steering wheel with handles and controls, a hood covering the engine and the luggage space, wherein the towed object contains a workplace for a driver, wherein the frame comprises the platform and a rigid frame, enclosing the platform along the entire perimeter, including the luggage space with an additional luggage compartment at a top of the frame, wherein the frame along with the platform is made asymmetrically relative to the track by extending the platform in one direction, wherein the steering wheel is attached to the frame via any of three points of attachment on mounting plates rigidly mounted on the frame on both sides, a steering wheel position limiter is made in the form of a transverse tube, wherein the metal subframe is made in the form of metal side plates connected to the frame with brackets bent into an S-shape, wherein on the metal side plates, track tightening mechanisms are placed in the form of an eccentric and self-aligning bearings, wherein the transmission comprises a variable drive pulley, a braking mechanism, and a reversing reduction gearbox each arranged on an intermediate shaft mounted on support brackets, an all-weather covering to protect the engine and the luggage space is made in the form of an all-weather hood, and wherein the object being towed is in the form of a sledge with a seat for the driver, the seat comprising a tubular welded structure with a folding backrest.

2. The motorized towing vehicle according to claim 1, wherein the rigid frame comprises metal tubes.

3. The motorized towing vehicle according to claim 1, wherein the frame can be high with installation of the engine and its elements and low with installation of engine components on the platform.

4. The motorized towing vehicle according to claim 1, wherein the platform carrying the engine with the transmission and luggage space comprises waterproof laminated plywood and is rigidly attached to the frame.

5. The motorized towing vehicle according to claim 1, wherein the metal side plates of the subframe have cut-out holes.

6. The motorized towing vehicle according to claim 1, wherein the intermediate shaft is mounted on self-aligning bearings.

7. The motorized towing vehicle according to claim 1, wherein the all-weather covering follows the shape of the frame and is made of lightweight, durable, water-repellent materials.

8. The motorized towing vehicle according to claim 1, wherein the folding backrest of the seat of the towed object comprises laminated waterproof plywood.

* * * * *